United States Patent
Yamada et al.

(10) Patent No.: US 9,945,472 B2
(45) Date of Patent: Apr. 17, 2018

(54) LUBRICATING STRUCTURE FOR TRANSMISSION

(71) Applicants: AISIN AW CO., LTD., Anjo-shi, Aichi-ken (JP); TOYOTA JIDOSHA KABUSHIKI KAISHA, Toyota-shi, Aichi-ken (JP)

(72) Inventors: Yuki Yamada, Nishio (JP); Junji Matsushita, Anjo (JP); Takeshi Horie, Anjo (JP); Keita Imai, Seto (JP); Koichi Okuda, Toyota (JP); Hidehiko Bansyoya, Toyota (JP); Kazuyuki Shiiba, Miyoshi (JP); Tooru Matsubara, Toyota (JP); Kuniaki Ishii, Toyota (JP)

(73) Assignees: AISIN AW CO., LTD., Anjo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/126,882

(22) PCT Filed: Mar. 30, 2015

(86) PCT No.: PCT/JP2015/059977
§ 371 (c)(1),
(2) Date: Sep. 16, 2016

(87) PCT Pub. No.: WO2015/152169
PCT Pub. Date: Oct. 8, 2015

(65) Prior Publication Data
US 2017/0114885 A1  Apr. 27, 2017

(30) Foreign Application Priority Data

Apr. 2, 2014 (JP) .................................. 2014-076136

(51) Int. Cl.
*F16H 57/021* (2012.01)
*F16H 57/02* (2012.01)
(Continued)

(52) U.S. Cl.
CPC ......... *F16H 57/0471* (2013.01); *B60K 6/365* (2013.01); *B60K 6/405* (2013.01);
(Continued)

(58) Field of Classification Search
None
See application file for complete search history.

(56) References Cited

U.S. PATENT DOCUMENTS

| 2003/0057004 A1* | 3/2003 | Morishita | ............... B60K 6/26 180/65.26 |
| 2004/0124722 A1* | 7/2004 | Uchida | .................. B60K 6/26 310/54 |

FOREIGN PATENT DOCUMENTS

| JP | S57-71898 U | 5/1982 |
| JP | S60-172049 U | 11/1985 |

(Continued)

OTHER PUBLICATIONS

Jun. 16, 2015 Search Report issued in International Patent Application No. PCT/JP2015/059977.

*Primary Examiner* — Colby M Hansen
(74) *Attorney, Agent, or Firm* — Oliff PLC

(57) ABSTRACT

A lubricating structure for a transmission includes: a case that includes a center support fixation portion that extends from the inner peripheral surface toward the radially inner side, and that houses the transmission on the first side of the center support fixation portion in the axial direction of the transmission; a center support that is press-fitted into the center support fixation portion, that rotatably supports an input shaft of the transmission, and that rotatably supports a (Continued)

clutch drum of the transmission; a bearing provided between the clutch drum and the center support in the axial direction; an oil reservoir portion formed on the center support on the second side of the center support fixation portion in the axial direction to open on the upper side in the vertical direction, the second side being opposite to the first side; and an oil passage formed in the center support, one end of the oil passage opening in the oil reservoir portion, and the other end of the oil passage opening in a space between the clutch drum and the center support in the axial direction.

13 Claims, 5 Drawing Sheets

(51) Int. Cl.
*B60K 6/365* (2007.10)
*B60K 6/405* (2007.10)
*F16H 57/04* (2010.01)
*B60K 6/445* (2007.10)

(52) U.S. Cl.
CPC .......... *B60K 6/445* (2013.01); *F16H 57/021* (2013.01); *F16H 57/0423* (2013.01); *F16H 57/0424* (2013.01); *B60Y 2200/92* (2013.01); *B60Y 2306/03* (2013.01); *B60Y 2400/80* (2013.01); *B60Y 2410/10* (2013.01); *F16H 2057/02034* (2013.01); *Y10S 903/91* (2013.01); *Y10S 903/952* (2013.01)

(56) References Cited

FOREIGN PATENT DOCUMENTS

| | | |
|---|---|---|
| JP | S64-74359 A | 3/1989 |
| JP | H03-123148 U | 12/1991 |
| JP | 2008-232287 A | 10/2008 |
| JP | 2013-096560 A | 5/2013 |

* cited by examiner

FIG.6

|      | C1 | C2 | C3 | B1 | B2 |
|------|----|----|----|----|----|
| 1st  | ○  |    |    |    | ○  |
| 2nd  | ○  |    |    | ○  |    |
| 3rd  | ○  | ○  |    |    |    |
| 4th  |    | ○  |    | ○  |    |
| Rev  |    |    | ○  |    | ○  |

LUBRICATING STRUCTURE FOR TRANSMISSION

BACKGROUND

The present disclosure relates to a lubricating structure for a transmission.

There is known a lubricating structure for a transmission that is provided with an oil passage in a partition wall and that can supply lubricating oil to the side of an input shaft and supply lubricating oil to the side of an output shaft via a second intermediate shaft (see Japanese Patent Application Publication No. 2008-232287, for example).

SUMMARY

In the configuration described in Japanese Patent Application Publication No. 2008-232287 described above, however, oil is discharged to the radially outer side by a centrifugal force after being led to the output shaft side with respect to a bearing provided between the partition wall and a clutch drum in the axial direction. Thus, the bearing cannot be lubricated efficiently.

In view of the foregoing, an exemplary aspect of the present disclosure provides a lubricating structure for a transmission that can efficiently lubricate a bearing provided between a clutch drum and a center support in the axial direction.

An exemplary aspect of the present disclosure provides a lubricating structure for a transmission, including: a case that includes a center support fixation portion that extends from an inner peripheral surface toward a radially inner side and that houses the transmission on a first side of the center support fixation portion in an axial direction of an input shaft of the transmission, the axial direction of the input shaft of the transmission being defined as a center of a radial direction and a circumferential direction; a center support that is press-fitted into the center support fixation portion, that rotatably supports the input shaft of the transmission, and that rotatably supports a clutch drum of the transmission; a bearing provided between the clutch drum and the center support in the axial direction; an oil reservoir formed on the center support on a second side of the center support fixation portion in the axial direction to open on an upper side in a vertical direction, the second side being opposite to the first side; and an oil passage formed in the center support, one end of the oil passage opening in the oil reservoir, and the other end of the oil passage opening in a space between the clutch drum and the center support in the axial direction.

According to the present disclosure, it is possible to provide a lubricating structure for a transmission that can efficiently lubricate a bearing provided between a clutch drum and a center support in the axial direction.

BRIEF DESCRIPTION OF THE DRAWINGS

FIG. 6 is an engagement table of a speed change device.

DETAILED DESCRIPTION OF EMBODIMENTS

An embodiment will be described in detail below with reference to the accompanying drawings.

Figure 1:
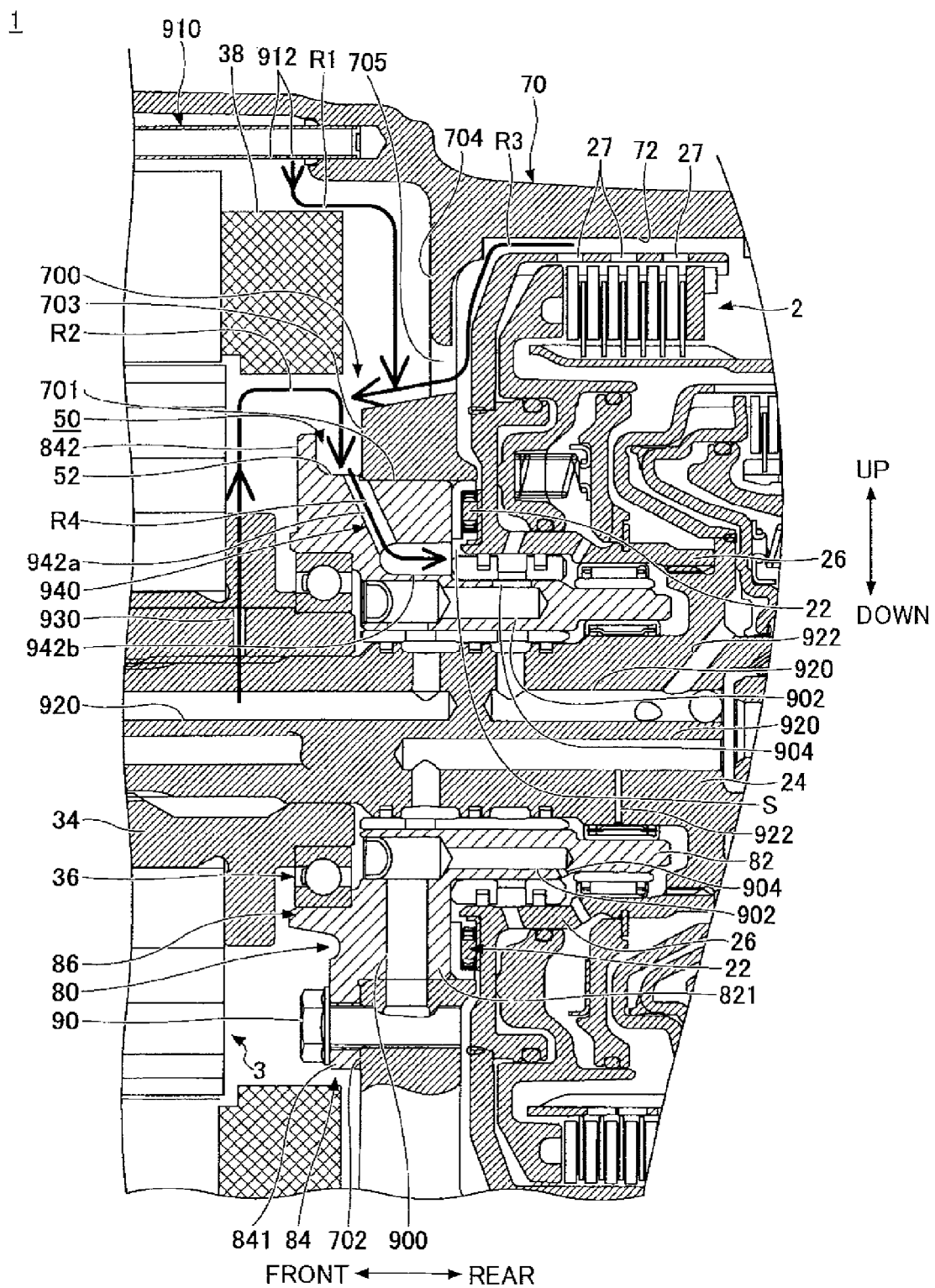
FIG. 1 is a sectional view illustrating an example of a lubricating structure for a transmission.
Figure 2:
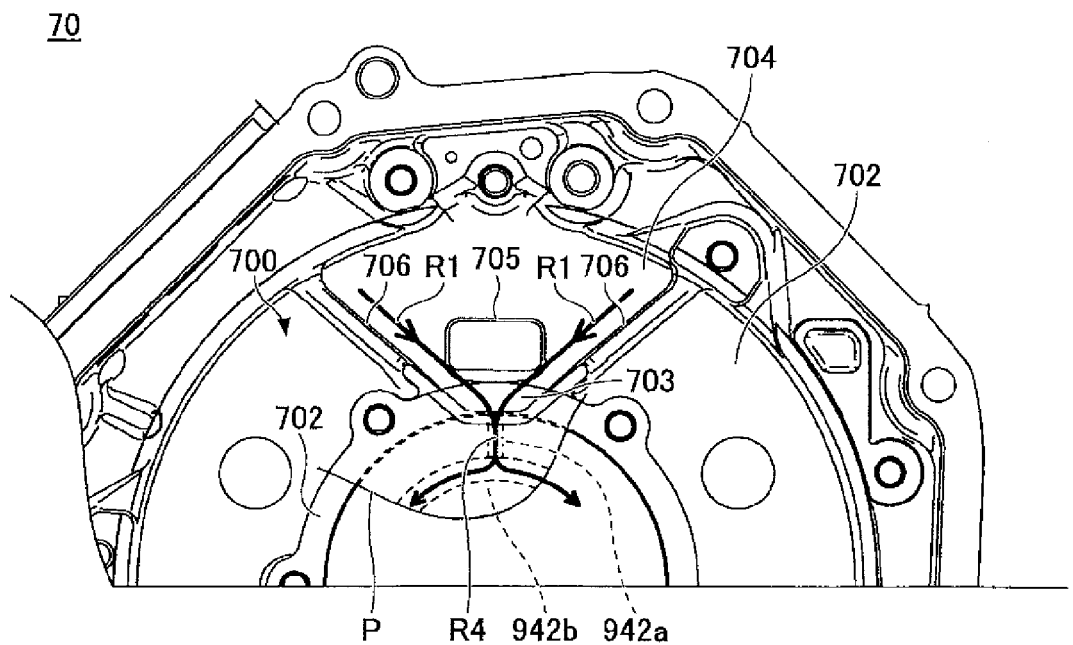
FIG. 2 illustrates the upper part of a case as seen from the front side.
Figure 3:
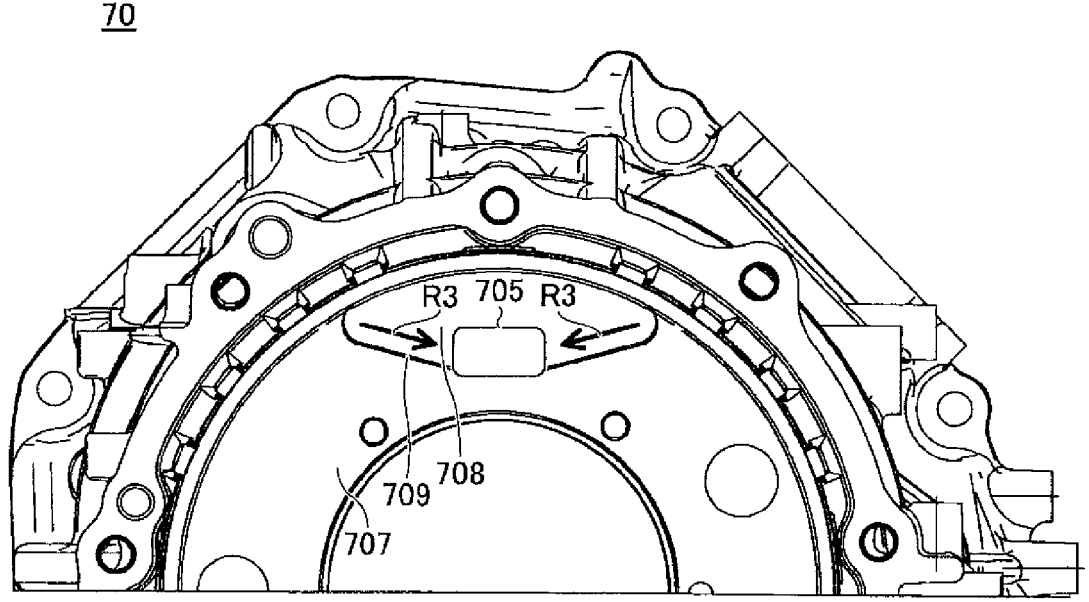
FIG. 3 illustrates the upper part of the case as seen from the rear side.

FIG. 1 is a sectional view illustrating an example of a lubricating structure 1 for a transmission 2. FIG. 2 illustrates the upper part of a case 70 as seen from the front side. FIG. 3 illustrates the upper part of the case 70 as seen from the rear side. FIG. 2 also illustrates a part of a center support 80. In FIG. 2, in addition, a part of the center support 80 on the upper side in the vertical direction (a portion upward of a line P) is illustrated as transparent such that the internal oil passage configuration is indicated by the dotted line.

In the example illustrated in FIG. 1, the lubricating structure 1 is applied to the transmission 2 for a hybrid vehicle or an electric vehicle. That is, the case 70 houses not only the transmission 2 but also an electric motor 3. Although the detailed configuration of the transmission 2 may be determined as desired, the lubricating structure 1 is suitable for any configuration that includes a bearing 22 and a clutch drum 26 or the like to be described below. Although the detailed configuration of the electric motor 3 may be determined as desired, the lubricating structure 1 is suitable for an inner-rotor configuration to be described below. In the example illustrated in FIG. 1, the electric motor 3 includes a rotary shaft 34 provided coaxially with an input shaft 24 of the transmission 2. The rotary shaft 34 is non-rotatably coupled to the input shaft 24.

In the following description, the up-down direction and the front-rear direction are defined as illustrated in FIG. 1. The up-down direction indicated in FIG. 1 indicates the upper and lower sides in the vertical direction (direction of a gravitational force). The front-rear direction corresponds to the front-rear direction of the vehicle. In the following description, in addition, unless otherwise mentioned, the radial, circumferential, and axial directions are determined with reference to the rotational axis of the input shaft 24 of the transmission 2. For example, the circumferential direction refers to the circumferential direction around the input shaft 24 of the transmission 2, and the radially inner side refers to the side that is closer to the rotational axis in the radial direction of the rotational axis.

The lubricating structure 1 includes the case 70 and the center support 80.

The case 70 houses therein the transmission 2, the electric motor 3, the center support 80, and so forth. The case 70 is formed by casting aluminum or the like, for example. The case 70 includes a center support fixation portion 700.

The center support fixation portion 700 extends from an inner peripheral surface 72 of the case 70 toward the radially inner side, and extends in the circumferential direction radially outward of the input shaft 24 of the transmission 2. The center support fixation portion 700 extends in the circumferential direction over the entire periphery of the inner peripheral surface 72 of the case 70. The case 70 houses the transmission 2 on the rear side with respect to the center support fixation portion 700, and houses the electric motor 3 on the front side with respect to the center support fixation portion 700. That is, the center support fixation portion 700 partitions a space in the case 70 into front and rear sections, houses the electric motor 3 in the space in the case 70 on the front side, and houses the transmission 2 in the space in the case 70 on the rear side.

The center support fixation portion 700 has a cavity 701 centered on the rotational axis and having a circular cross section. That is, the center support fixation portion 700 has a ring shape as viewed in the axial direction. The center support 80 is press-fitted into the cavity 701.

The front surface of the center support fixation portion 700 includes a seat surface 702, an oil reservoir forming surface 703, an oil guide surface 704, and stepped surfaces (ribs) 706.

The seat surface 702 is formed around the cavity 701 to extend in the circumferential direction. The normal direction of the seat surface 702 corresponds to the axial direction. The seat surface 702 is provided to extend over the entire circumference except for the upper side in the vertical direction. The center support fixation portion 700 is fastened to the center support 80 by a bolt 90 in the region of the seat surface 702.

The normal direction of the oil reservoir forming surface 703 corresponds to the axial direction. It should be noted, however, that the normal direction of the oil reservoir forming surface 703 may be inclined with respect to the axial direction or include a curved surface. In the example illustrated in FIG. 1 etc., the oil reservoir forming surface 703 is formed in the same plane as the seat surface 702. The function of the oil reservoir forming surface 703 will be discussed later.

The oil guide surface 704 is formed in the region upward of the center support fixation portion 700 in the vertical direction. As illustrated in FIG. 2, the oil guide surface 704 is formed in the region upward, in the vertical direction, of the region in which the front surface of the center support fixation portion 700 extends in the circumferential direction. As illustrated in FIG. 1, the oil guide surface 704 is formed to be offset rearward with respect to the seat surface 702. That is, the oil guide surface 704 forms a recessed portion in the front surface of the center support fixation portion 700. The oil guide surface 704 extends to the inner peripheral surface 72 on the radially outer side, and extends to the oil reservoir forming surface 703 on the radially inner side. The function of the oil guide surface 704 will be discussed later.

A hole 705 is formed in the oil guide surface 704. The hole 705 penetrates the center support fixation portion 700 in the axial direction. As illustrated in FIG. 2, the hole 705 may be formed downward of the oil guide surface 704 in the vertical direction. The shape, the size, etc. of the hole 705 may be determined as desired.

As illustrated in FIG. 2, the stepped surfaces 706 extend in the axial direction such that an offset is removed in the axial direction between the oil guide surface 704 and the seat surface 702. That is, the oil guide surface 704 and the seat surface 702 are continuous in the circumferential direction via the stepped surfaces 706. As illustrated in FIG. 2, the stepped surfaces 706 are formed on both sides of the oil guide surface 704 in the circumferential direction. As illustrated in FIG. 2, the stepped surfaces 706 on both sides of the oil guide surface 704 in the circumferential direction are formed to be proximate to each other as the stepped surfaces 706 extend toward the radially inner side (lower side in the vertical direction). That is, the oil guide surface 704 is formed such that the distance between the two stepped surfaces 706 on both sides in the circumferential direction becomes smaller toward the radially inner side (that is, formed in a fan shape). The function of the stepped surfaces 706 will be discussed later.

The rear surface of the center support fixation portion 700 may include a base surface 707, a rear oil guide surface 708 formed by offsetting the base surface 707 forward, and rear stepped surfaces 709. As with the oil guide surface 704, the rear oil guide surface 708 is formed on the upper side in the vertical direction. That is, the rear oil guide surface 708 is substantially formed on the back side of the oil guide surface 704. In this case, as illustrated in FIG. 3, the hole 705 is positioned in the rear oil guide surface 708. As illustrated in FIG. 3, the rear stepped surfaces 709 may be formed so as to be continuous with an end portions of the hole 705 on the radially inner side.

The center support 80 is press-fitted into the center support fixation portion 700 in the axial direction from the front side. The center support 80 is fastened to the center support fixation portion 700 by the bolt 90.

The center support 80 includes a body portion 82, a flange portion 84, and a motor shaft support portion 86.

The body portion 82 has a cylindrical shape. The body portion 82 forms a portion (press-fitted portion) of the center support 80 on the rear side with respect to the seat surface 702. The body portion 82 rotatably supports the input shaft 24 of the transmission 2 on the radially inner side. The body portion 82 has an expanded diameter portion 821 at an end portion on the front side. The outside diameter of the expanded diameter portion 821 generally coincides with the diameter of the cavity 701. The bearing 22 is disposed at the outer peripheral portion of the rear surface of the expanded diameter portion 821. That is, the bearing 22 is disposed between the outer peripheral portion of the rear surface of the expanded diameter portion 821 and the clutch drum 26 in the axial direction. The radially outer side of the bearing 22 abuts against the center support fixation portion 700 in the radial direction.

The flange portion 84 extends toward the radially outer side of the expanded diameter portion 821. The flange portion 84 includes a first flange portion 841 and a second flange portion 842.

As illustrated in FIG. 1, the first flange portion 841 contacts the seat surface 702 of the center support fixation portion 700 in the axial direction. The first flange portion 841 is provided with a hole that allows insertion of the bolt 90.

As illustrated in FIG. 1, the second flange portion 842 is formed on the upper side in the vertical direction. The second flange portion 842 faces the oil reservoir forming surface 703 with a space therebetween in the axial direction. Both circumferential end portions of the second flange portion 842 are continuous with the first flange portion 841. That is, the second flange portion 842 is provided close to the oil reservoir forming surface 703 at the both circumferential end portions, and contacts the seat surface 702 to be continuous with the first flange portion 841. Consequently, an oil reservoir portion 50 (i.e., oil reservoir) is formed between the second flange portion 842 and the oil reservoir forming surface 703 in the axial direction. The oil reservoir portion 50 is formed to open on the upper side in the vertical direction. In the example illustrated in FIG. 1, the oil reservoir portion 50 has a bottom surface 52 provided around the radially outer position of the expanded diameter portion 821.

The motor shaft support portion 86 is formed radially inward of the flange portion 84. The motor shaft support portion 86 rotatably supports the rotary shaft 34 of the electric motor 3 via a bearing 36.

Next, the oil passage configuration will be described.

An oil passage 900 is formed in the center support fixation portion 700. The oil passage 900 is formed downward of the expanded diameter portion 821 of the center support fixation portion 700 in the vertical direction. An oil supply source (not illustrated) is connected to the oil passage 900. Oil flows upward in the oil passage 900. The oil passage 900 is connected to an oil passage 902 that extends in the axial direction. The oil passage 902 is formed in the body portion 82. The oil passage 902 has a discharge portion 904 on the radially outer side. Oil is supplied from the discharge portion 904 to the constituent elements of the transmission 2 by a centrifugal force. Oil discharged from the discharge portion 904 is mainly supplied to constituent elements provided on the rear side with respect to the clutch drum 26, among the constituent elements of the transmission 2.

An oil passage 910 is disposed on the upper side in the case 70 in the vertical direction. In the example illustrated in FIG. 1, the oil passage 910 is in the form of a tube that extends in the axial direction. However, the oil passage 910 may be formed in the case 70. An oil supply source (not illustrated) is connected to the oil passage 910. Oil flows rearward in the oil passage 910. The oil passage 910 has a discharge portion 912 at an end portion of the oil passage 910. The discharge portion 912 is positioned upward of the oil reservoir portion 50 in the vertical direction. The discharge portion 912 overlaps a coil end 38 of the electric motor 3 in the axial direction. That is, the discharge portion 912 faces the radially outer side of the coil end 38 in the radial direction. Oil from the discharge portion 912 is supplied to constituent elements (mainly the coil end 38) radially inward of the discharge portion 912 by a gravitational force.

An oil passage 920 is formed in the input shaft 24. A plurality of oil passages 920 may be formed. Oil is supplied to the oil passage 920 via the oil passage 900. The oil passage 920 has a discharge portion 922 on the radially outer side. Oil is supplied from the discharge portion 922 to the constituent elements of the transmission 2 by a centrifugal force. Oil discharged from the discharge portion 922 is mainly supplied to constituent elements provided on the rear side with respect to the clutch drum 26, among the constituent elements of the transmission 2.

A discharge portion 930 is formed in the rotary shaft 34 of the electric motor 3. The discharge portion 930 extends in the radial direction, and communicates with the oil passage 920 in the input shaft 24 on the radially inner side. The discharge portion 930 overlaps the coil end 38 of the electric motor 3 in the axial direction. That is, the discharge portion 930 faces the radially inner side of the coil end 38 in the radial direction. Oil is supplied to the discharge portion 930 from the oil passage 920. Oil is supplied to constituent elements (mainly the coil end 38) radially outward of the discharge portion 930 by a centrifugal force.

An oil passage 940 is formed in the center support 80. The oil passage 940 is formed upward of the center support 80 in the vertical direction. As illustrated in FIG. 1, one end of the oil passage 940 opens in the oil reservoir portion 50, and the other end of the oil passage 940 opens in a space S between the clutch drum 26 and the center support 80 in the axial direction. In the example illustrated in FIG. 1, the space S is positioned on the rear side with respect to the rear surface of the expanded diameter portion 821 and on the front side with respect to the clutch drum 26.

In the example illustrated in FIG. 1, the oil passage 940 includes a first oil passage portion 942a and a second oil passage portion 942b. One end of the first oil passage portion 942a opens at the lowermost portion of the oil reservoir portion 50, and the first oil passage portion 942a extends in an oblique direction toward the radially inner side and the rear side. Preferably, the first oil passage portion 942a extends further inward than the bearing 22 as illustrated in FIG. 1. The second oil passage portion 942b is connected to the other end of the first oil passage portion 942a. As illustrated in FIG. 1, the second oil passage portion 942b is formed radially inward of the bearing 22. The second oil passage portion 942b opens in the axial direction in the rear surface of the expanded diameter portion 821. The second oil passage portion 942b may extend in the circumferential direction as illustrated in FIG. 2.

Next, the flow of oil will be described. In FIGS. 1 to 3, how oil flows is schematically indicated by arrows R1 to R4.

As schematically indicated by the arrow R1, oil supplied to the oil passage 910 is dropped downward in the vertical direction via the discharge portion 912. The oil is directly splashed onto the radially outer side of the coil end 38 to cool the coil end 38. As schematically indicated by the arrow R1, the oil which has been used to cool the coil end 38 flows rearward from the coil end 38 in the axial direction to be applied to the region upward, in the vertical direction, of the front surface of the center support fixation portion 700. At this time, the oil guide surface 704 and the stepped surface 706 demonstrate a guide function such that the oil is led to the oil reservoir portion 50 along the oil guide surface 704 as schematically indicated by the arrow R1 (also see FIG. 2). In this way, the oil from the oil passage 910, which has been used to cool the coil end 38, is collected in the oil reservoir portion 50. The oil which has been led to the oil reservoir portion 50 through the path of the arrow R1 in this way becomes larger in amount when the rear side of the case 70 is inclined rearward (that is, when the vehicle is tilted rearward). This is because, when the vehicle is tilted rearward, the front surface of the center support fixation portion 700 is oriented obliquely upward such that a larger amount of oil is applied to the oil guide surface 704.

As schematically indicated by the arrow R2, oil supplied to the oil passage 900 is discharged from the discharge portion 930 via the oil passage 920 etc. The oil is directly splashed onto the radially inner side of the coil end 38 to cool the coil end 38. The oil which has been used to cool the coil end 38 in this way is splashed back from the coil end 38 to be dropped into the oil reservoir portion 50 radially inward of the coil end 38. In this way, the oil from the oil passage 920, which has been used to cool the coil end 38, is collected in the oil reservoir portion 50. The oil which has been led to the oil reservoir portion 50 through the path of the arrow R2 in this way becomes larger in amount when the rear side of the case 70 is inclined rearward (that is, when the vehicle is tilted rearward). This is because, when the vehicle is tilted rearward, oil splashed back at the front side of the coil end 38 can also be collected in the oil reservoir portion 50.

As schematically indicated by the arrow R3, a part of the oil which has been supplied to the oil passage 900 and supplied to lubricate and cool the constituent elements of the transmission 2 reaches the radially outer side of the clutch drum 26 from discharge portions 27 radially outward of the clutch drum 26 on the upper side in the vertical direction. The oil flows along the outer peripheral surface of the clutch drum 26, reaches the front side of the clutch drum 26, and is applied to the region upward, in the vertical direction, of the rear surface of the center support fixation portion 700. At this time, the rear oil guide surface 708 and the rear stepped surfaces 709 demonstrate a guide function, so that the oil is led to the hole 705 of the center support fixation portion 700 along the rear oil guide surface 708 as schematically indicated by the arrow R3 (also see FIG. 3). The oil reaches the front surface of the center support fixation portion 700 through the hole 705 of the center support fixation portion 700, and reaches the inside of the oil reservoir portion 50 downward, in the vertical direction, of the exit (front side) of the hole 705 by a gravitational force. In this way, a part of the oil which has been supplied to cool and lubricate the constituent elements of the transmission 2 is collected in the oil reservoir portion 50. The oil which has been led to the oil reservoir portion 50 through the path of the arrow R3 in this way becomes larger in amount when the front side of the case 70 is inclined downward (that is, when the vehicle is tilted forward). This is because, when the vehicle is tilted forward, the rear surface of the center support fixation portion 700 is oriented obliquely upward, so that a larger amount of oil is applied to the rear oil guide surface 708 to reach the oil reservoir portion 50.

As schematically indicated by the arrow R4, oil in the oil reservoir portion 50 reaches the space S via the oil passage 940 by a gravitational force. In this event, the oil in the oil reservoir portion 50 reaches the rear side of the center support 80 and the radially inner side of the bearing 22 via the oil passage 940. The oil is applied to the bearing 22 on the radially outer side by a centrifugal force, and used to lubricate the bearing 22. The oil in the oil reservoir portion 50 is mainly collected through the paths indicated by the arrows R1 to R3 discussed above. In practice, however, the oil also includes oil that has reached the inside of the oil reservoir portion 50 via another path.

The bearing 22 is positioned on the front side with respect to the clutch drum 26, and thus the oil which has been supplied to lubricate and cool the constituent elements of the transmission 2 is not easily supplied to the bearing 22. For example, oil that has reached the radially outer side of the clutch drum 26 from the discharge portions 27 of the clutch drum 26 may be supplied to the bearing 22. However, the oil is supplied in a sufficient amount only when the vehicle is tilted forward.

In this respect, a comparative configuration in which oil is directly supplied from the oil passage 900 to the inner peripheral side of the bearing 22, for example, is also conceivable. With such a comparative configuration, however, a larger amount of oil flows from the oil passage 900 toward the inner peripheral side of the bearing 22, which disadvantageously tends to make the amount of oil to be supplied to the constituent elements of the transmission 2 via the oil passages 902, 920, etc. insufficient.

With the embodiment discussed above, in contrast, a necessary amount of oil can be supplied to the bearing 22 through the other paths (see the arrows R1 to R4) without directly supplying oil from the oil passage 900 to the inner peripheral side of the bearing 22 as discussed above. Consequently, a necessary amount of oil can be supplied to the constituent elements of the transmission 2 including the bearing 22.

With the embodiment discussed above, in addition, a necessary amount of oil can be supplied to the bearing 22 utilizing the oil which has been used to cool the coil end 38 (see the arrows R1 and R2) as discussed above.

With the embodiment discussed above, in addition, a necessary amount of oil can be supplied to the bearing 22 even when the vehicle is tilted forward since oil can be supplied to the bearing 22 through the path indicated by the arrow R3 as discussed above. This feature is effective in compensating for a reduction in amount of oil that reaches the oil reservoir portion 50 through the paths indicated by the arrows R1 and R2, since the oil is reduced when the vehicle is tilted forward.

Next, an example of a vehicle drive device that is suitable for application of the lubricating structure 1 for the transmission 2 discussed above will be described.

The lubricating structure 1 for the transmission 2 discussed above can stably supply oil to the bearing 22, irrespective of the rotational speed of the input shaft 24, even in the case where the lubricating structure 1 is applied to a vehicle drive device in which the input shaft 24 is rotated at a high rotational speed (e.g. about 1.3 times the rotational speed of the internal combustion engine EG). An example of a vehicle drive device in which the input shaft 24 is rotated at a high rotational speed will be described below.

The term "drivably coupled" as used in the following description refers to a state in which two rotary elements are coupled in such a way that enables transfer of a drive force, which includes a state in which the two rotary elements are coupled so as to rotate together with each other, and a state in which the two rotary elements are coupled in such a way that enables transfer of a drive force via one or two or more transmission members.

Figure 4:
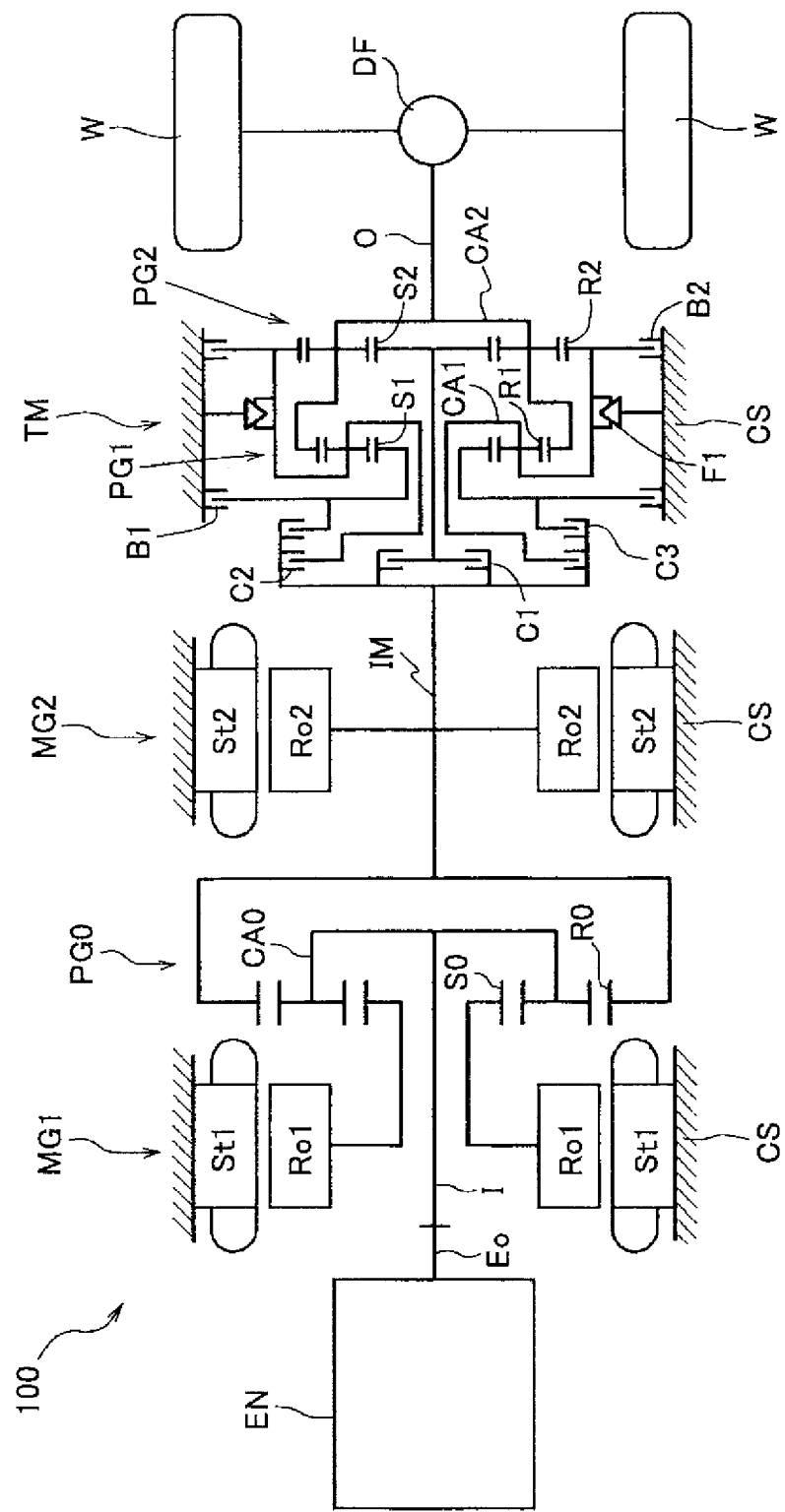
FIG. 4 is a skeleton diagram illustrating a schematic configuration of a vehicle drive device.
Figure 5:
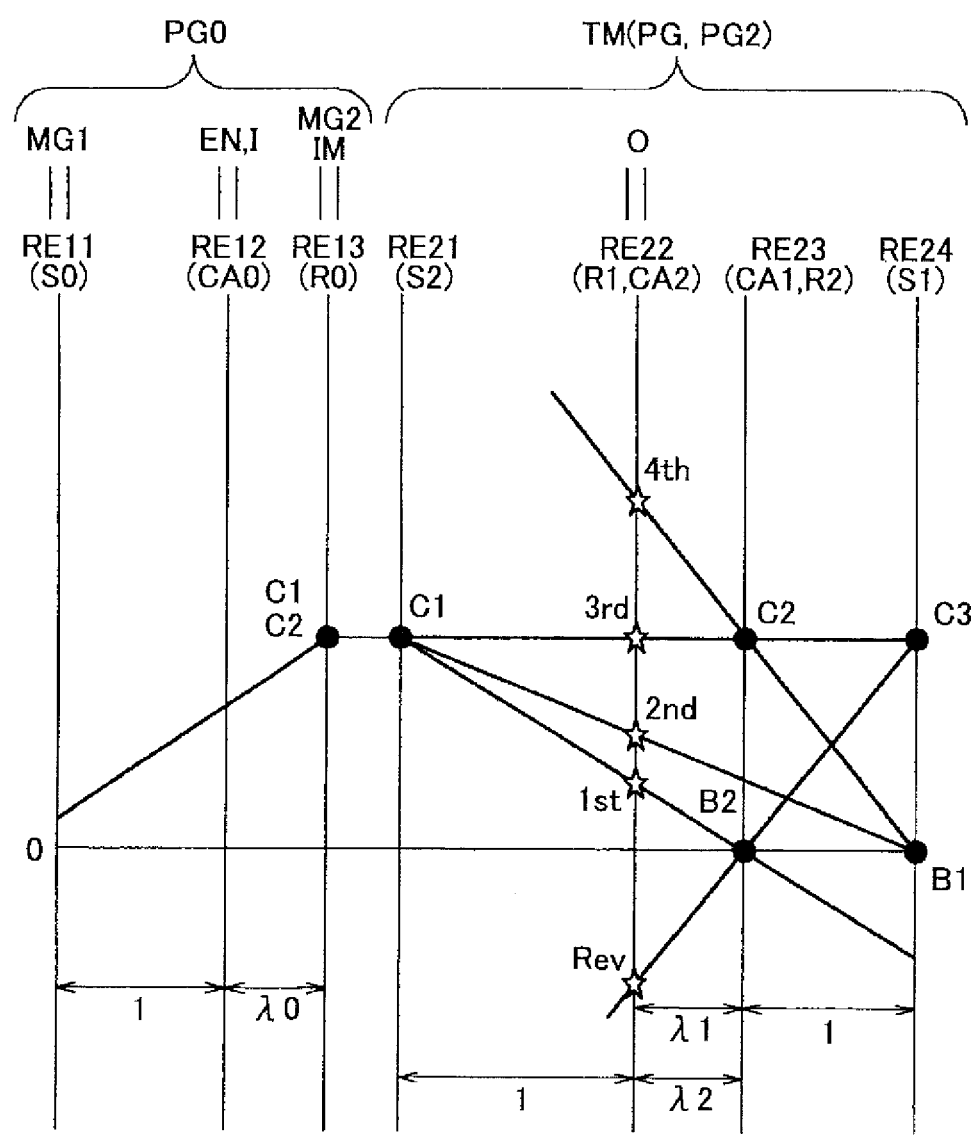
FIG. 5 is a velocity diagram of the vehicle drive device.
Figure 6:
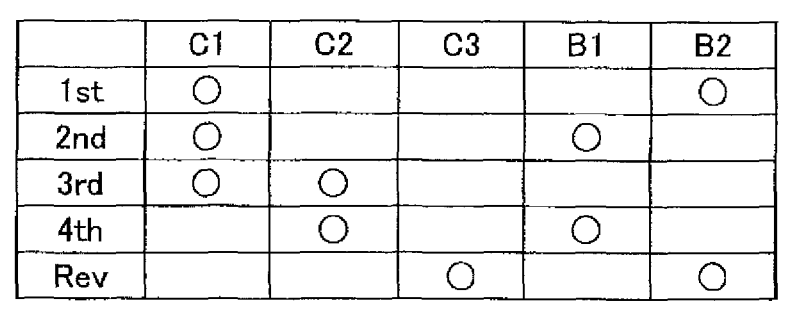

FIG. 4 is a skeleton diagram illustrating a schematic configuration of a vehicle drive device. FIG. 5 is a velocity diagram of the vehicle drive device. FIG. 6 is an engagement table of a speed change device TM.

As illustrated in FIG. 4, the vehicle drive device includes a first motor MG1, an input member I drivably coupled to an internal combustion engine EN, an output member O drivably coupled to wheels W, a second motor MG2, a differential gear device PG0, and a speed change device TM. The second motor MG2 corresponds to the electric motor 3 in the description of the lubricating structure 1 discussed above. The speed change device TM corresponds to the transmission 2 in the description of the lubricating structure 1 discussed above.

As illustrated in FIG. 5, the differential gear device PG0 has a first rotary element RE11, a second rotary element RE12, and a third rotary element RE13 disposed in this order in the velocity diagram. The first motor MG1 is drivably coupled to the first rotary element RE11. The internal combustion engine EN is drivably coupled to the second rotary element RE12 via the input member I. The second motor MG2 and an intermediate input member IM are drivably coupled to the third rotary element RE13. As illustrated in FIGS. 4 to 6, the speed change device TM includes a plurality of engagement devices C1, B1, . . . , and selectively establishes a plurality of shift speeds 1st, 2nd, . . . with different speed ratios in accordance with the state of engagement of the plurality of engagement devices C1, B1, . . . to transfer rotation of the intermediate input member IM to the output member O with a rotational speed ωim of the intermediate input member IM changed with a speed ratio Ktm of the established shift speed. The intermediate input member IM corresponds to the input shaft 24 in the description of the lubricating structure 1 discussed above.

The internal combustion engine EN is a heat engine driven by combustion of fuel. Various internal combustion engines known in the art such as a gasoline engine and a diesel engine, for example, may be used as the internal combustion engine EN. In the example, an engine output shaft Eo, such as a crankshaft of the internal combustion engine EN, is drivably coupled to the input member I.

As illustrated in FIG. 5, the differential gear device PG0 has a first rotary element RE11, a second rotary element RE12, and a third rotary element RE13 disposed in this order in the velocity diagram. The differential gear device PG0 is constituted of a single-pinion planetary gear device, and has three rotary elements, namely a carrier CA0 that supports a plurality of pairs of pinion gears, a sun gear S0 meshed with the pinion gears, and a ring gear R0 meshed with the pinion gears. Here, the sun gear S0 serves as the first rotary element RE11, the carrier CA0 serves as the second rotary element RE12, and the ring gear R0 serves as the third rotary element RE13. The first rotary element RE11 (sun gear S0) of the differential gear device PG0 is drivably coupled so as to rotate together with the first motor MG1. The second rotary element RE12 (carrier CA0) of the differential gear device PG0 is drivably coupled so as to rotate together with the internal combustion engine EN via the input member I. The third rotary element RE13 (ring gear R0) of the differential gear device PG0 is drivably coupled so as to rotate together with the second motor MG2 and the intermediate input member IM. The differential gear device PG0 can be caused to function as a continuously variable speed change device that can continuously vary a speed ratio Kpg (hereinafter referred to as the speed ratio Kpg of the differential gear device PG0), which is a ratio of a rotational speed $\omega e$ of the internal combustion engine EN to the rotational speed $\omega im$ of the intermediate input member IM, by varying the balance of the respective rotational speeds of the rotary elements. Here, the speed ratio Kpg of the differential gear device PG0 is a value (Kpg=$\omega e/\omega im$) obtained by dividing the rotational speed $\omega e$ of the internal combustion engine EN by the rotational speed $\omega im$ of the intermediate input member IM, for example.

The first motor MG1 has a stator St1 fixed to a case CS that houses the vehicle drive device, and a rotor Ro1 rotatably supported on the radially inner side at a position corresponding to the stator St1. The rotor Ro1 of the first motor MG1 is drivably coupled so as to rotate together with the first rotary element RE11 (sun gear S0) of the differential gear device PG0. The first motor MG1 is electrically connected to a battery that serves as an electricity accumulation device via an inverter that performs a DC/AC conversion. The first motor MG1 can function as a motor (electric motor) that is supplied with electric power to produce power and as a generator (electric generator) that is supplied with power to produce electric power. That is, the first motor MG1 performs power running using electric power supplied from the battery via the inverter, or generates electric power using a rotational drive force transferred from the internal combustion engine EN or the wheels W. The generated electric power is accumulated in the battery via the inverter.

The second motor MG2 has a stator St2 fixed to the case CS which houses the vehicle drive device, and a rotor Ro2 rotatably supported on the radially inner side at a position corresponding to the stator St2. The rotor Ro2 of the second motor MG2 is drivably coupled so as to rotate together with the third rotary element RE13 (ring gear R0) of the differential gear device PG0 and the intermediate input member IM. The second motor MG2 is electrically connected to a battery that serves as an electricity accumulation device via an inverter that performs a DC/AC conversion. The second motor MG2 can function as a motor (electric motor) that is supplied with electric power to produce power and as a generator (electric generator) that is supplied with power to produce electric power. That is, the second motor MG2 performs power running using electric power supplied from the battery via the inverter, or generates electric power using a rotational drive force transferred from the internal combustion engine EN or the wheels W. The generated electric power is accumulated in the battery via the inverter.

The speed change device TM is drivably coupled to the intermediate input member IM. In the embodiment, the speed change device TM is a stepped automatic speed change device that provides a plurality of shift speeds with different speed ratios. In order to establish the plurality of shift speeds, the speed change device TM includes a gear mechanism such as a planetary gear device and the plurality of engagement devices C1, B1, . . . . The speed change device TM transfers rotation of the intermediate input member IM to the output member O with the rotational speed $\omega im$ of the intermediate input member IM changed with the speed ratio Ktm of each shift speed and with torque converted. The torque transferred from the speed change device TM to the output member O is distributed and transferred to two, left and right, axles via an output differential gear device DF to be transferred to the wheels W drivably coupled to the axles. Here, the speed ratio Ktm of the speed change device TM is the ratio of the rotational speed $\omega im$ of the intermediate input member IM to a rotational speed $\omega$ of the output member O in the case where each shift speed is established in the speed change device TM, and is a value (Ktm=$\omega im/\omega o$) obtained by dividing the rotational speed $\omega im$ of the intermediate input member IM by the rotational speed $\omega$ of the output member O, for example. That is, the rotational speed $\omega$ of the output member O is calculated by dividing the rotational speed $\omega im$ of the intermediate input member IM by the speed ratio Ktm. In addition, torque To (hereinafter referred to as speed change output torque To) transferred from the speed change device TM to the output member O is calculated by multiplying torque Tim (hereinafter referred to as speed change input torque Tim) transferred from the intermediate input member IM to the speed change device TM by the speed ratio Ktm (To=Tim×Ktm).

In the embodiment, as illustrated in the operation table of FIG. 6, the speed change device TM provides four shift speeds (a first speed 1st, a second speed 2nd, a third speed 3rd, and a fourth speed 4th) with different speed ratios (speed reduction ratios or speed increase ratios) as forward shift speeds. In order to establish the shift speeds, the speed change device TM is configured to include gear mechanisms including a first planetary gear device PG1 and a second planetary gear device PG2, and six engagement elements C1, C2, C3, B1, B2, and F1. Switching is made among the four shift speeds by controlling engagement and disengagement of the plurality of engagement devices C1, B1, . . . excluding the one-way clutch F1, changing the rotational state of each rotary element of the first planetary gear device PG1 and the second planetary gear device PG2, and selectively engaging the plurality of engagement devices C1, B1, . . . . Besides the four shift speeds described above, the speed change device TM also provides one reverse shift speed Rev. In FIG. 6, the symbol "○" indicates that each engagement device is in the engaged state, and the presence of "no symbol" indicates that each engagement device is in the disengaged state.

In the embodiment, as illustrated in FIG. 5, the speed change device TM has a first rotary element RE21, a second rotary element RE22, a third rotary element RE23, and a fourth rotary element RE24 disposed in this order in the velocity diagram. The speed change device TM is composed of the two single-pinion planetary gear devices PG1 and PG2. The first planetary gear device PG1 has three rotary elements, namely a first carrier CA1 that supports a plurality of pairs of pinion gears, a first sun gear S1 meshed with the pinion gears, and a first ring gear R1 meshed with the pinion gears. The second planetary gear device PG2 has three rotary elements, namely a second carrier CA2 that supports a plurality of pairs of pinion gears, a second sun gear S2 meshed with the pinion gears, and a second ring gear R2 meshed with the pinion gears. Here, the first carrier CA1 of the first planetary gear device PG1 and the second ring gear R2 of the second planetary gear device PG2 are drivably coupled so as to serve as rotary elements that rotate together with each other. In addition, the first ring gear R1 of the first planetary gear device PG1 and the second carrier CA2 of the second planetary gear device PG2 are drivably coupled so as to serve as rotary elements that rotate together with each other. The second sun gear S2 serves as the first rotary element RE21. The first ring gear R1 and the second carrier CA2 which rotate together with each other serve as the second rotary element RE22. The first carrier CA1 and the second ring gear R2 which rotate together with each other serve as the third rotary element RE23. The first sun gear S1 serves as the fourth rotary element RE24.

The first rotary element RE21 (second sun gear S2) of the speed change device TM is drivably coupled to the third rotary element RE13 (ring gear R0) of the differential gear device PG0 via the first clutch C1. The second rotary element RE22 (first ring gear R1 and second carrier CA2) of the speed change device TM is drivably coupled to the output member O. The third rotary element RE23 (first carrier CA1 and second ring gear R2) of the speed change device TM is drivably coupled to the third rotary element RE13 (ring gear R0) of the differential gear device PG0 via the second clutch C2, and selectively made stationary with respect to the case CS, which serves as a non-rotary member, via the second brake B2 or the one-way clutch F1. The fourth rotary element RE24 (first sun gear S1) of the speed change device TM is selectively made stationary with respect to the case CS, which serves as a non-rotary member, via the first brake B1, and drivably coupled to the third rotary element RE13 (ring gear R0) of the differential gear device PG0 via the third clutch C3.

In the velocity diagram illustrated in FIG. 5, the vertical axis corresponds to the rotational speed of each rotary element. That is, the indication "0" provided on the vertical axis indicates that the rotational speed is zero, with the upper side corresponding to positive rotation (the rotational speed is positive) and the lower side corresponding to negative rotation (the rotational speed is negative). A plurality of vertical lines disposed in parallel correspond to the respective rotary elements of the differential gear device PG0 and the respective rotary elements of the speed change device TM. That is, "RE11 (S0)", "RE12 (CA0)", and "RE13 (R0)" provided above the vertical lines correspond to the first rotary element RE11 (sun gear S0), the second rotary element RE12 (carrier CA0), and the third rotary element RE13 (ring gear R0), respectively, of the differential gear device PG0. In addition, "RE21 (S2)", "RE22 (R1, CA2)", "RE23 (CA1, R2)", and "RE24 (S1)" provided above the vertical lines correspond to the first rotary element RE21 (second sun gear S2), the second rotary element RE22 (first ring gear R1 and second carrier CA2), the third rotary element RE23 (first carrier CA1 and second ring gear R2), and the fourth rotary element RE24 (first sun gear S1), respectively, of the speed change device TM. The distance between each of the plurality of vertical lines disposed in parallel is determined on the basis of gear ratios $\lambda 0$, $\lambda 1$, and $\lambda 2$ of the planetary gear devices PG0, PG1, and PG2 (the gear ratio between the sun gear and the ring gear=[number of teeth of sun gear]/[number of teeth of ring gear]).

In the velocity diagram, the symbol "•" indicates that the engagement device coupled to the rotary element is in the engaged state. "C1", "C2", "C3", "B1", and "B2" provided adjacent to the symbol "•" indicate the engagement device in the engaged state. The star symbol indicates the state of the rotational speed of the second rotary element RE22 (first ring gear R1 and second carrier CA2) of the speed change device TM which is coupled to the output member O. "1st", "2nd", "3rd", "4th", and "Rev" provided adjacent to the star symbol indicate the shift speed to be established.

With the vehicle drive device 100 illustrated in FIGS. 4 to 6, an output of the internal combustion engine EG is drivably coupled to the intermediate input member IM of the speed change device TM via the differential gear device PG0. Therefore, rotation of the internal combustion engine EG is input to the speed change device TM with the rotational speed of the internal combustion engine EG increased depending on the status of use, so that the intermediate input member IM is rotated at a rotational speed that is significantly higher than that of the normal speed change device TM (e.g. about 1.3 times the rotational speed of the internal combustion engine EG).

Although an embodiment has been discussed in detail above, the present disclosure is not limited to a specific embodiment, and a variety of modifications and changes may be made without departing from the scope of the disclosure. In addition, all or a plurality of the constituent elements according to the embodiment discussed earlier may be combined with each other.

For example, in the embodiment discussed above, oil is efficiently collected in the oil reservoir portion 50 through three paths indicated by the arrows R1 to R3. However, an oil passage configuration that forms any one of the paths, or an oil passage configuration that forms any combination of two of the paths, among the three paths indicated by the arrows R1 to R3, may be omitted.

In the embodiment discussed above, the electric motor 3 is housed in the case 70. However, the electric motor 3 may be omitted. That is, the configuration according to the embodiment discussed above may also be entirely or partially applied to a transmission for a vehicle that is not a hybrid vehicle or an electric vehicle. In this case, an oil passage configuration that forms the path indicated by the arrow R2, among the three paths indicated by the arrows R1 to R3, may be omitted, for example.

In the embodiment discussed above, the oil reservoir portion 50 is formed by the center support 80 and the center support fixation portion 700 (oil reservoir forming surface 703). However, the oil reservoir portion 50 may be formed by only the center support 80. That is, a surface that corresponds to the oil reservoir forming surface 703 may be formed on the center support 80.

In the embodiment discussed above, the transmission 2 is disposed on the rear side with respect to the center support fixation portion 700. However, the present disclosure may also be applied to a configuration in which the transmission 2 is disposed on the front side with respect to the center support fixation portion 700, for example.

In relation to the embodiment described above, the following configurations are further disclosed.

(1) A lubricating structure 1 for a transmission 2, including:

a case 70 that includes a center support fixation portion 700 that extends from an inner peripheral surface 72 toward a radially inner side and that houses the transmission 2 on a first side of the center support fixation portion 700 in an axial direction of the transmission 2, the axial direction of an input shaft 24 of the transmission 2 being defined as a center of a radial direction and a circumferential direction;

a center support 80 that is press-fitted into the center support fixation portion 700, that rotatably supports the input shaft 24 of the transmission 2, and that rotatably supports a clutch drum 26 of the transmission 2;

a bearing 22 provided between the clutch drum 26 and the center support 80 in the axial direction;

an oil reservoir portion 50 formed on the center support 80 on the second side of the center support fixation portion 700 in the axial direction to open on the upper side in the vertical direction, the second side being opposite to the first side; and an oil passage 940 formed in the center support 80, one end of the oil passage opening in the oil reservoir portion 50, and the other end of the oil passage opening in a space between the clutch drum 26 and the center support 80 in the axial direction.

According to the configuration described in (1), it is possible to efficiently collect oil in the oil reservoir portion 50 which opens on the upper side in the vertical direction, and to supply oil to a space between the clutch drum 26 and the center support 80 in the axial direction via the oil passage 940 which opens in the oil reservoir portion 50. Consequently, the bearing 22 which is provided between the clutch drum 26 and the center support 80 in the axial direction can be lubricated efficiently.

(2) The lubricating structure 1 for a transmission 2 according to (1), further including an oil passage 910 that has a discharge portion 912 provided upward of the oil reservoir portion 50 in the vertical direction, in which the discharge portion 912 overlaps the oil reservoir portion 50 in the axial direction.

According to the configuration described in (2), it is possible to efficiently collect oil dropped from the oil passage 910 in the oil reservoir portion 50. Consequently, the bearing 22 can be lubricated efficiently using oil on the first side of the center support fixation portion 700 in the axial direction of the transmission 2.

(3) The lubricating structure 1 for a transmission 2 according to (1) or (2), further including:

a motor 3 that is housed in the case 70 on the second side of the center support fixation portion 700 in the axial direction and that includes a rotary shaft 34 provided coaxially with the input shaft 24 of the transmission 2, in which the oil reservoir portion 50 is disposed radially inward of a coil end 38 of the motor 3, and overlaps the coil end 38 of the motor 3 in the axial direction.

According to the configuration described in (3), it is possible to efficiently collect oil used to cool the coil end 38 of the motor 3 in the oil reservoir portion 50. Consequently, the bearing 22 can be lubricated efficiently using oil used to cool the coil end 38 of the motor 3.

(4) The lubricating structure 1 for a transmission 2 according to any one of (1) to (3), further including a hole 705 formed in the center support fixation portion 700 upward of the one end of the oil passage 940 in the vertical direction to penetrate the center support fixation portion 700 in the axial direction.

According to the configuration described in (4), it is possible to efficiently collect oil on the first side of the center support fixation portion 700 in the axial direction of the transmission 2 (oil utilized to lubricate the transmission 2 etc.) in the oil reservoir portion 50 via the hole 705. The bearing 22 can be lubricated efficiently using oil utilized to lubricate the transmission 2 etc.

(5) The lubricating structure 1 for a transmission 2 according to any one of (1) to (4), in which the other end of the oil passage 940 opens radially inward of the bearing 22.

According to the configuration described in (5), it is possible to direct oil, which has been supplied from the oil reservoir portion 50 to the space between the clutch drum 26 and the center support 80 in the axial direction via the oil passage 940, toward the bearing 22 on the radially outer side by a centrifugal force. Consequently, the bearing 22 can be lubricated efficiently.

(6) The lubricating structure 1 for a transmission 2 according to any one of (1) to (5), in which:

the center support 80 includes a flange portion 84 that extends in the circumferential direction around the input shaft 24 of the transmission 2 while overlapping the center support fixation portion 700 in the radial direction;

the flange portion 84 includes a first flange portion 841 that contacts the center support fixation portion 700 in the axial direction, and a second flange portion 842 formed on the upper side, in the vertical direction, in a range in which the flange portion 84 is extended in the circumferential direction and that is spaced from the center support fixation portion 700 in the axial direction; and the oil reservoir portion 50 is formed between the second flange portion 842 of the center support 80 and the center support fixation portion 700.

According to the configuration described in (6), it is possible to form the oil reservoir portion 50 utilizing a part (a portion upward in the vertical direction) of the flange portion of the center support 80 in the circumferential direction.

(7) The lubricating structure 1 for a transmission 2 according to any one of (1) to (6), in which:

a surface of the center support fixation portion 700 on the second side in the axial direction of the center support fixation portion 700 extends in the circumferential direction around the input shaft 24 of the transmission 2; and the surface of the center support fixation portion 700 on the second side includes a seat surface 702 that contacts the center support 80 in the axial direction;

an oil guide surface 704 offset toward the first side of the seat surface 702 in the axial direction and formed on the upper side, in the vertical direction, in a range in which the surface of the center support fixation portion 700 on the second side is extended in the circumferential direction, and a stepped surface 706 formed between the seat surface 702 and the oil guide surface 704 to extend in the axial direction.

According to the configuration described in (7), it is possible to efficiently increase the amount of oil that flows into the oil reservoir portion 50 utilizing the surface of the center support fixation portion 700 on the second side.

(8) The lubricating structure 1 for a transmission 2 according to (7), in which the oil guide surface 704 is formed such that a distance in the circumferential direction between two stepped surfaces 706 on both sides in the circumferential direction becomes smaller toward the radially inner side.

According to the configuration described in (8), it is possible to guide oil from a wide range in the circumferential direction to the oil reservoir portion 50, and to efficiently increase the amount of oil that can be collected in the oil reservoir portion 50.

(9) The lubricating structure 1 for a transmission 2 according to (7), further including:

a hole 705 formed in the center support fixation portion 700 upward of the one end of the oil passage 940 in the vertical direction to penetrate the center support fixation portion 700 in the axial direction, wherein:

the hole 705 is formed in the oil guide surface 704; and the oil reservoir portion 50 is positioned downward of the oil guide surface 704 in the vertical direction.

According to the configuration described in (9), it is possible to efficiently collect oil on the first side of the center support fixation portion in the axial direction of the transmission 2 (oil utilized to lubricate the transmission 2 etc.) in the oil reservoir portion 50 via the hole 705.

(10) The lubricating structure 1 for a transmission 2 according to any one of (1) to (9), in which:

the transmission 2 is included in a vehicle drive device 100;

the vehicle drive device 100 includes a first motor MG1, a second motor MG2 (=motor 3), and a differential gear device PG0 in addition to the transmission 2; and the differential gear device PG0 includes a first rotary element (S0), a second rotary element (CA0), and a third rotary element (R0) arranged in this order in a velocity diagram, the first motor MG1 is drivably coupled to the first rotary element (S0), an internal combustion engine EG is drivably coupled to the second rotary element (CA0), and the second motor MG2 and the input shaft 24 of the transmission 2 are drivably coupled to the third rotary element (R0).

According to the configuration described in (10), an output of the internal combustion engine EG is drivably coupled to the input shaft 24 of the transmission 2 via the differential gear device PG0. Therefore, rotation of the internal combustion engine EG is input to the transmission 2 with the rotational speed of the internal combustion engine EG increased depending on the status of use, so that the input shaft 24 is rotated at a rotational speed that is significantly higher than that of the normal transmission 2 (e.g. about 1.3 times the rotational speed of the internal combustion engine EG). Thus, in the case of such a drive force device, which has a structure in which oil is supplied to a bearing from the radially inner side via an oil passage in an input shaft from an oil passage in a partition wall as described in Japanese Patent Application Publication No. 2008-232287 described above, oil must be supplied against a centrifugal force of the input shaft which rotates at a high speed. Therefore, the amount of oil supplied into the input shaft is reduced, and the amount of oil supplied to the bearing is also accordingly reduced. With the lubricating structure 1 for a transmission 2 according to any one of (1) to (9), in contrast, it is possible to stably supply oil to the bearing 22, irrespective of the rotational speed of the input shaft 24, even in the case where the lubricating structure 1 is applied to the vehicle drive device 100 in which the input shaft 24 is rotated at a high rotational speed (e.g. about 1.3 times the rotational speed of the internal combustion engine EG).

The present international application claims priority to Japanese Patent Application No. 2014-076136 filed Apr. 2, 2014, the entire contents of which are incorporated herein by reference.

The invention claimed is:

1. A lubricating structure for a transmission, comprising:
a case that includes a center support fixation portion that extends from an inner peripheral surface toward a radially inner side and that houses the transmission on a first side of the center support fixation portion in an axial direction of an input shaft of the transmission, the axial direction of the input shaft of the transmission being defined as a center of a radial direction and a circumferential direction;
a center support that is press-fitted into the center support fixation portion, that rotatably supports the input shaft of the transmission, and that rotatably supports a clutch drum of the transmission;
a bearing provided between the clutch drum and the center support in the axial direction;
an oil reservoir formed on the center support on a second side of the center support fixation portion in the axial direction to open on an upper side in a vertical direction, the second side being opposite to the first side;
an oil passage formed in the center support, one end of the oil passage opening in the oil reservoir, and the other end of the oil passage opening in a space between the clutch drum and the center support in the axial direction; and
an oil supply passage that has a discharge portion provided upward of the oil reservoir in the vertical direction, wherein
the discharge portion overlaps the oil reservoir in the axial direction.

2. The lubricating structure for a transmission according to claim 1, wherein:
the transmission is included in a vehicle drive device;
the vehicle drive device includes a first motor, a second motor, and a differential gear device in addition to the transmission; and
the differential gear device includes a first rotary element, a second rotary element, and a third rotary element arranged in this order in a velocity diagram, the first motor is drivably coupled to the first rotary element, an internal combustion engine is drivably coupled to the second rotary element, and the second motor and the input shaft of the transmission are drivably coupled to the third rotary element.

3. The lubricating structure for a transmission according to claim 1, wherein:
the transmission is included in a vehicle drive device;
the vehicle drive device includes a first motor, a second motor, and a differential gear device in addition to the transmission; and
the differential gear device includes a first rotary element, a second rotary element, and a third rotary element arranged in this order in a velocity diagram, the first motor is drivably coupled to the first rotary element, an internal combustion engine is drivably coupled to the second rotary element, and the second motor and the input shaft of the transmission are drivably coupled to the third rotary element.

4. The lubricating structure for a transmission according to claim 1, further comprising:
a motor that is housed in the case on the second side of the center support fixation portion in the axial direction and that includes a rotary shaft provided coaxially with the input shaft of the transmission, wherein
the oil reservoir is disposed radially inward of a coil end of the motor, and overlaps the coil end of the motor in the axial direction.

5. The lubricating structure for a transmission according to claim 4, wherein:
the transmission is included in a vehicle drive device, and the motor is included in the vehicle drive device as a second motor;
the vehicle drive device includes a first motor and a differential gear device in addition to the transmission and the second motor; and
the differential gear device includes a first rotary element, a second rotary element, and a third rotary element arranged in this order in a velocity diagram, the first motor is drivably coupled to the first rotary element, an internal combustion engine is drivably coupled to the second rotary element, and the second motor and the input shaft of the transmission are drivably coupled to the third rotary element.

6. The lubricating structure for a transmission according to claim 1, wherein
the other end of the oil passage opens radially inward of the bearing.

7. A lubricating structure for a transmission, comprising:
a case that includes a center support fixation portion that extends from an inner peripheral surface toward a radially inner side and that houses the transmission on a first side of the center support fixation portion in an axial direction of an input shaft of the transmission, the axial direction of the input shaft of the transmission being defined as a center of a radial direction and a circumferential direction;
a center support that is press-fitted into the center support fixation portion, that rotatably supports the input shaft of the transmission, and that rotatably supports a clutch drum of the transmission;
a bearing provided between the clutch drum and the center support in the axial direction;
an oil reservoir formed on the center support on a second side of the center support fixation portion in the axial direction to open on an upper side in a vertical direction, the second side being opposite to the first side;
an oil passage formed in the center support, one end of the oil passage opening in the oil reservoir, and the other end of the oil passage opening in a space between the clutch drum and the center support in the axial direction; and
a motor that is housed in the case on the second side of the center support fixation portion in the axial direction and that includes a rotary shaft provided coaxially with the input shaft of the transmission, wherein
the oil reservoir is disposed radially inward of a coil end of the motor, and overlaps the coil end of the motor in the axial direction.

8. The lubricating structure for a transmission according to claim 7, wherein:
the transmission is included in a vehicle drive device, and the motor is included in the vehicle drive device as a second motor;
the vehicle drive device includes a first motor and a differential gear device in addition to the transmission and the second motor; and
the differential gear device includes a first rotary element, a second rotary element, and a third rotary element arranged in this order in a velocity diagram, the first motor is drivably coupled to the first rotary element, an internal combustion engine is drivably coupled to the second rotary element, and the second motor and the input shaft of the transmission are drivably coupled to the third rotary element.

9. A lubricating structure for a transmission, comprising:
a case that includes a center support fixation portion that extends from an inner peripheral surface toward a radially inner side and that houses the transmission on a first side of the center support fixation portion in an axial direction of an input shaft of the transmission, the axial direction of the input shaft of the transmission being defined as a center of a radial direction and a circumferential direction;
a center support that is press-fitted into the center support fixation portion, that rotatably supports the input shaft of the transmission, and that rotatably supports a clutch drum of the transmission;
a bearing provided between the clutch drum and the center support in the axial direction;
an oil reservoir formed on the center support on a second side of the center support fixation portion in the axial direction to open on an upper side in a vertical direction, the second side being opposite to the first side;
an oil passage formed in the center support, one end of the oil passage opening in the oil reservoir, and the other end of the oil passage opening in a space between the clutch drum and the center support in the axial direction; and
a hole formed in the center support fixation portion upward of the one end of the oil passage in the vertical direction to penetrate the center support fixation portion in the axial direction.

10. A lubricating structure for a transmission, comprising:
a case that includes a center support fixation portion that extends from an inner peripheral surface toward a radially inner side and that houses the transmission on a first side of the center support fixation portion in an axial direction of an input shaft of the transmission, the axial direction of the input shaft of the transmission being defined as a center of a radial direction and a circumferential direction;
a center support that is press-fitted into the center support fixation portion, that rotatably supports the input shaft of the transmission, and that rotatably supports a clutch drum of the transmission;
a bearing provided between the clutch drum and the center support in the axial direction;
an oil reservoir formed on the center support on a second side of the center support fixation portion in the axial direction to open on an upper side in a vertical direction, the second side being opposite to the first side; and
an oil passage formed in the center support, one end of the oil passage opening in the oil reservoir, and the other end of the oil passage opening in a space between the clutch drum and the center support in the axial direction;
wherein:
the center support includes a flange portion that extends in the circumferential direction around the input shaft of the transmission while overlapping the center support fixation portion in the radial direction;
the flange portion includes a first flange portion that contacts the center support fixation portion in the axial direction, and a second flange portion formed on the upper side, in the vertical direction, in a range in which the flange portion is extended in the circumferential direction and that is spaced from the center support fixation portion in the axial direction; and
the oil reservoir is formed between the second flange portion of the center support and the center support fixation portion.

11. A lubricating structure for a transmission, comprising:
a case that includes a center support fixation portion that extends from an inner peripheral surface toward a radially inner side and that houses the transmission on a first side of the center support fixation portion in an axial direction of an input shaft of the transmission, the axial direction of the input shaft of the transmission being defined as a center of a radial direction and a circumferential direction;
a center support that is press-fitted into the center support fixation portion, that rotatably supports the input shaft of the transmission, and that rotatably supports a clutch drum of the transmission;

a bearing provided between the clutch drum and the center support in the axial direction;

an oil reservoir formed on the center support on a second side of the center support fixation portion in the axial direction to open on an upper side in a vertical direction, the second side being opposite to the first side; and an oil passage formed in the center support, one end of the oil passage opening in the oil reservoir, and the other end of the oil passage opening in a space between the clutch drum and the center support in the axial direction;

wherein:
- a surface of the center support fixation portion on the second side extends in the circumferential direction around the input shaft of the transmission; and
- the surface of the center support fixation portion on the second side includes:
  - a seat surface that contacts the center support in the axial direction;
  - an oil guide surface offset toward the first side of the seat surface in the axial direction and formed on the upper side, in the vertical direction, in a range in which the surface of the center support fixation portion on the second side is extended in the circumferential direction, and
  - a stepped surface formed between the seat surface and the oil guide surface to extend in the axial direction.

12. The lubricating structure for a transmission according to claim 11, wherein
the oil guide surface is formed such that a distance in the circumferential direction between two stepped surfaces on both sides in the circumferential direction becomes smaller toward the radially inner side.

13. The lubricating structure for a transmission according to claim 11, further comprising:
a hole formed in the center support fixation portion upward of the one end of the oil passage in the vertical direction to penetrate the center support fixation portion in the axial direction, wherein:
the hole is formed in the oil guide surface; and
the oil reservoir is positioned downward of the oil guide surface in the vertical direction.

* * * * *